United States Patent
Enders

(10) Patent No.: US 9,145,921 B2
(45) Date of Patent: Sep. 29, 2015

(54) RADIAL-ROLLER ANTIFRICTION BEARING ARRANGEMENT, IN PARTICULAR FOR A NEEDLE SLEEVE

(75) Inventor: Johannes Enders, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/237,643

(22) PCT Filed: May 7, 2012

(86) PCT No.: PCT/EP2012/058332
§ 371 (c)(1),
(2), (4) Date: Feb. 7, 2014

(87) PCT Pub. No.: WO2013/020726
PCT Pub. Date: Feb. 14, 2013

(65) Prior Publication Data
US 2014/0185976 A1    Jul. 3, 2014

(30) Foreign Application Priority Data
Aug. 10, 2011    (DE) .......................... 10 2011 080 743

(51) Int. Cl.
| | |
|---|---|
| F16C 33/76 | (2006.01) |
| F16C 33/78 | (2006.01) |
| F16C 19/46 | (2006.01) |
| F02M 25/07 | (2006.01) |
| F02D 9/10 | (2006.01) |
| F16K 1/22 | (2006.01) |
| F16K 1/226 | (2006.01) |

(52) U.S. Cl.
CPC ............ *F16C 33/7809* (2013.01); *F02D 9/106* (2013.01); *F02M 25/0793* (2013.01);
(Continued)

(58) Field of Classification Search
CPC ............... F16C 19/463; F16C 33/7869; F16C 33/7873; F16C 33/7876; F16C 33/7879; F16C 33/7883; F16C 33/7886; F16C 33/7896
USPC .................................................. 384/486, 484
See application file for complete search history.

(56) References Cited

U.S. PATENT DOCUMENTS 3,447,848 A  *  6/1969  Pitner ............................ 384/484
3,592,400 A  *  7/1971  Gith ........................... 242/483.5
(Continued)

FOREIGN PATENT DOCUMENTS

DE    1888002    2/1964
DE    7035926    1/1971
(Continued)

*Primary Examiner* — Phillip A Johnson
(74) *Attorney, Agent, or Firm* — Volpe and Koenig, P.C.

(57) ABSTRACT

A radial-roller antifriction bearing arrangement, in particular for a needle sleeve (1), which includes a thin-walled outer ring (4), which can be inserted into a bore (2) of a housing (3) and which has two radially inwardly directed rims (5, 6), and of a needle ring (7) which is held in the outer ring (4) by said rims (5, 6). Here, the needle ring (7) is formed by a needle cage (8) and by a multiplicity of bearing needles (9) guided therein at uniform intervals in the circumferential direction, which bearing needles roll on the inner lateral surface (10) of the outer ring (4) and on the outer lateral surface (11) of a shaft (12) to be mounted or of a separate inner ring. Furthermore, axially adjacent to the side surfaces (13, 14) of the needle cage (8) there are arranged at least two seals (15, 16) which protect the needle sleeve (1) against dirt from the outside and against loss of lubricant. At least one of the seals (15 or 16) is formed from an elastomer as a multi-lip seal composed of at least two component rings (17, 18) arranged adjacent to one another, which multi-lip seal extends over that part of the inner lateral surface (10) of the outer ring (4) which is arranged between the associated rim (5 or 6) of the outer ring (4) and the adjacent side surface (13 or 14) of the needle cage (8) and over the inner lateral surface (19), the end surface (20) and the outer lateral surface (21) of the rim (5 or 6).

8 Claims, 2 Drawing Sheets

(52) U.S. Cl.
CPC ........... *F16C19/466* (2013.01); *F16C 33/7823* (2013.01); *F16C 33/7853* (2013.01); *F16C 33/7896* (2013.01); *F16K 1/224* (2013.01); *F16K 1/2268* (2013.01); *F16C 2360/22* (2013.01); *F16C 2361/91* (2013.01); *Y02T 10/121* (2013.01)

(56) References Cited

U.S. PATENT DOCUMENTS 4,353,605 A * 10/1982 Chiba et al. ................... 384/465

5,419,641 A * 5/1995 Fujinami et al. ............... 384/470

FOREIGN PATENT DOCUMENTS

| | | |
|---|---|---|
| DE | 2144172 | 3/1973 |
| DE | 2221234 | 11/1973 |
| DE | 1575697 | 1/1979 |
| DE | 6908931 | 7/1988 |
| DE | 4235117 | 4/1994 |
| DE | 102006053716 | 5/2008 |
| FR | 1357455 | 4/1964 |
| JP | 2004293618 | 10/2004 |

* cited by examiner

RADIAL-ROLLER ANTIFRICTION BEARING ARRANGEMENT, IN PARTICULAR FOR A NEEDLE SLEEVE

FIELD OF THE INVENTION

The invention relates to a radial roller bearing assembly which can be realized, in particular, advantageously at bearing points which are configured with sealed needle bushes.

BACKGROUND

It is generally known in antifriction bearing technology that needle bushes are the design of needle bearings which have the smallest radial overall height and make bearings possible which are particularly space-saving and simple to assemble with a high radial load-bearing capability. They are used in virtually all areas of the technology and comprise substantially a thin-walled outer ring which can be inserted into a housing hole and has two radially inwardly directed rims on its axial sides, and a needle ring which is held in the outer ring by said rims and is formed by a needle cage and a multiplicity of bearing needles which are guided in the latter at uniform spacings in the circumferential direction. Here, the bearing needles roll on the inner circumferential face of the outer ring, which inner circumferential face is configured as a raceway, and on the outer circumferential face of the shaft to be mounted, which outer circumferential face is likewise configured as a raceway, or, if the shaft cannot be configured as a raceway, on the outer circumferential face of a separate inner ring. Moreover, in the case of sealed needle bush embodiments, at least two seals are arranged axially next to the side faces of the needle cage within the needle bush, which seals are known in a multiplicity of various embodiments and protect the needle bush against contaminants from the outside and the loss of lubricant.

It is known, for example, from DE 42 35 117 A1 and DE 10 2006 053 716 A1 to seal a needle bush by way of two lip seals which are arranged on both sides next to the needle cage, are of C-shaped profile cross section, and one profile limb of which bears against that part of the inner circumferential face of the outer ring which is arranged between the respective rim and the needle cage, whereas the other profile limb of which, which points in each case toward the rims of the outer ring, rests rubbingly on the circumferential face of the shaft which is to be mounted.

Furthermore, it is known from DE 1 888 002 U1 to use two rubber seals which have a horizontal Z-profile in cross section as seals for a needle bush, which rubber seals seal with their free ends of one radial profile limb in each case the angled regions between the inner circumferential face of the outer ring and the rims and rest rubbingly with their other ends on the circumferential face of the shaft which is to be mounted. The adjoining profile web of said seals then extends obliquely upward into the interior of the needle bush, in each case as far as below the needle cage, and the adjoining second radial profile limb likewise rests rubbingly with its free end on the circumferential face of the shaft which is to be mounted.

Moreover, it is also known from DE 6 908 931 U1 and DE 7 035 926 U1 to arrange a seal on the end face of a radial rim of a needle bush. In DE 6 908 931 U1, said seal is configured here as a rubber sealing ring which is vulcanized on and has a shoulder which bears against the end face of the rim and a collar which protrudes into the needle bush and on which a sealing lip is formed integrally which rests rubbingly on the circumferential face of the shaft which is to be mounted. In DE 7 035 926 U1, in contrast, the seal is formed by a separate rubber lip seal which, on its upper side, has a circumferential annular groove for plugging the seal onto the rim end face and, on its underside, has one or more sealing lips which rests/rest rubbingly on the circumferential face of the shaft which is to be mounted.

Furthermore, it is known from DE 2 221 234 A1, in order to seal a needle bush, to insert two sealing rings which have a horizontal U-profile in cross section into the outer ring in such a way that they bear with their uppermost axial profile limb and their radial profile web against the inner circumferential face of the outer ring and against the inner circumferential face of the rims. The second profile limb of said sealing rings which adjoins the profile web is configured as a sealing lip arm which protrudes into the needle bush, at the end of which sealing lip arm a sealing lip is integrally formed which is shaped as a V-profile and into which a tension spring or a resilient ring which braces the sealing lip against the shaft which is to be mounted is inserted.

Finally, it is also known from DE 1 575 697 A1 to seal a needle bush by way of seals which are arranged on the outer circumferential face of the rims of the outer ring. To this end, the rims in each case have an axially inwardly directed right-angled bend with a circumferential sealing ring which is vulcanized on, has various straight or angular profile cross sections and is configured with one or more sealing lips which is/are in sealing contact rubbingly with the shaft which is to be mounted. In the embodiments with angular profile cross sections, moreover, the sealing ring extends along the end face of the rims as far as into the interior of the needle bush and has a single sealing lip at the end of one or the other profile limb.

All the above-described solutions have the common disadvantage, however, that the seals which are used do not have a sufficient sealing action, in order for it to be possible to use them as needle bushes which are configured as a throttle valve bearing for pivotably mounting the throttle valve shaft of a regulating device for exhaust gas recirculation in internal combustion engines. The reason for this is that throttle valve bearings of this type in exhaust gas recirculation regulating devices are subjected to correspondingly increased amounts of exhaust gas condensates as the amounts of what are known as blow-by gases increase, which exhaust gas condensates penetrate via the housing holes for the throttle valve shaft to the throttle valve bearings. Said exhaust gas condensates have a composition which is from oily/watery to watery/acidic, with the result that the needle bushes which as a rule are composed of a hardened roller bearing steel are subjected first of all to intensified attack from external corrosion which continues as far as into the interior of the needle bushes even in the case of multiple sealing of said needle bushes by way of known seals. Here, the condensate first of all forms a rust layer on the outer circumferential face of the rim of the needle bushes, which rust layer, during further advancing of the corrosion, spreads out over the end faces of the rims by way of rust infiltration of the seals as far as into the interior of the needle bushes, with the result that damage and the failure of the throttle valve bearings associated with the functional failure of the throttle valve occur.

SUMMARY

Proceeding from the described disadvantages of the solutions of the known prior art, the invention is therefore based on the object of designing a radial roller bearing assembly, in particular for a needle bush, in which the seals which are used have a sealing action against external corrosion such that the needle bush is also suitable as a throttle valve bearing for pivotably mounting the throttle valve shaft of a regulating device for exhaust gas recirculation in internal combustion engines.

According to the invention, this object is achieved in a radial roller bearing assembly according to the invention in which at least one of the seals is configured as a multiple-lip seal which is made from an elastomer, comprises at least two component rings arranged adjacent to one another and extends over that part of the internal circumferential face of the outer ring which is arranged between the associated rim of the outer ring and the adjacent side face of the needle cage and over the internal circumferential face, the end face and the outer circumferential face of the rim.

Preferred refinements and advantageous developments of the radial roller bearing assembly which is configured according to the invention are described below.

According to one embodiment, the realization of the radial roller bearing assembly which is configured according to the invention requires first of all that that rim of the outer ring which is enclosed by the seal which is configured as a multiple-lip seal is of radially shortened configuration and, in front of said rim, the hole in the housing is produced with an additional step for receiving a seal. Although this means that both the outer ring of the needle bush and the housing hole have to be modified slightly in comparison with the previously known embodiments, the modifications should be zero cost as far as possible, since said modifications have no influence on the previous manufacturing processes for the outer ring and the housing hole by way of deep drawing and by way of drilling or milling, respectively.

In a further refinement, the seal which is configured as a multiple-lip seal on the needle bush of the radial roller bearing assembly which is configured according to the invention is also distinguished by the fact that it preferably consists of a rim-side component ring and a cage-side component ring, which are each jointly configured with a basic profile part which virtually fills the space between the rim of the outer ring and the side face of the needle cage, wherein the basic profile part of the cage-side component ring has a first radial sealing lip which is in sealing contact with the shaft and which extends either below the rim-side component ring or directly towards the shaft. The basic profile part of the rim-side component ring is then adjoined by a profile limb which extends below the end face of the rim of the outer ring as far as in front of the rim and has a second radial sealing lip which is in sealing contact with the shaft and at the end of which finally a third radial sealing lip is also arranged which is in sealing contact with the additional step of the hole in the housing. Here, said third sealing lip is advantageously set obliquely with respect to the radial circumferential face of the step in the housing hole, with the result that a rise in the pressure which acts from outside on the sealing lip automatically brings about an increase in the sealing force of said sealing lip. A configuration of this type of the seal combined with three sealing lips and the likewise sealing basic bodies has as a rule proved sufficient to avoid external corrosion on the needle bush, but it would also be conceivable to configure the seal with further sealing lips with respect to the shaft or with respect to the step in the housing hole.

It is also an expedient development of the seal which is configured as a multiple-lip seal on the needle bush of the radial roller bearing assembly which is configured according to the invention that a circumferential annular groove is additionally arranged in the rim-side side face of the cage-side component ring of the seal, which annular groove is provided to increase the elasticity of the first radial sealing lip which is formed integrally on said component ring.

By way of the described embodiment, the radial roller bearing assembly which is configured according to the invention therefore has the advantage in comparison with the radial roller bearing assemblies which are known from the prior art that, as a result of the complete enclosure of the rims of the needle bush and as a result of the virtually complete filling of the space between the rim of the outer ring and the side face of the needle cage, the seals which are used have a sealing action against external corrosion such that the needle bush is also suitable as a throttle valve bearing for pivotably mounting the throttle valve shaft of a regulating device for exhaust gas recirculation in internal combustion engines.

BRIEF DESCRIPTION OF THE DRAWINGS

In the following text, the radial roller bearing assembly which is configured according to the invention will be explained in greater detail in two preferred embodiments with reference to the appended drawings, in which.

DETAILED DESCRIPTION OF THE PREFERRED EMBODIMENTS

Figure 1:
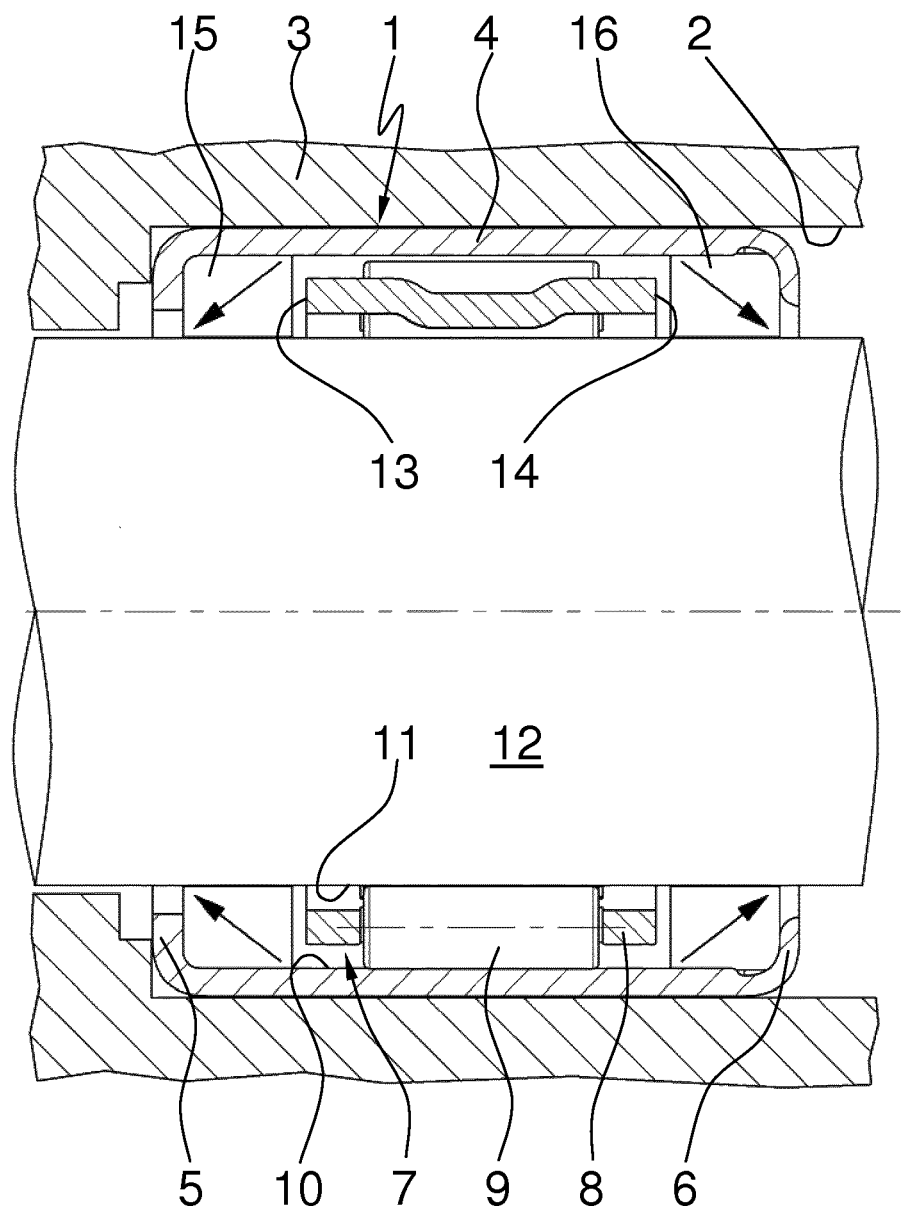
FIG. 1 shows a cross section through a bearing arrangement, configured according to the invention, of a sealed needle bush.

A bearing arrangement for a needle bush 1 is clearly apparent from FIG. 1, which bearing arrangement is configured as a throttle valve bearing for pivotably mounting the throttle valve shaft of a regulating device for exhaust gas recirculation in internal combustion engines. This needle bush 1 comprises substantially a thin-walled outer ring 4 which is inserted into a hole 2 of a housing 3 and has two radially inwardly directed rims 5, 6 on its axial sides, and a needle ring 7 which is held in the outer ring 4 by said rims 5, 6. Here, the needle ring 7 is formed by a needle cage 8 and a multiplicity of bearing needles 9 which are guided in the latter at uniform spacings in the circumferential direction and roll on the inner circumferential face 10 of the outer ring 4 and on the outer circumferential face 11 of a shaft 12 which is to be mounted. Moreover, two seals 15, 16 which protect the needle bush 1 against contaminants from the outside and the loss of lubricant and are initially shown only diagrammatically in FIG. 1 are arranged axially next to the side faces 13, 14 of the needle cage 8.

Figure 2:
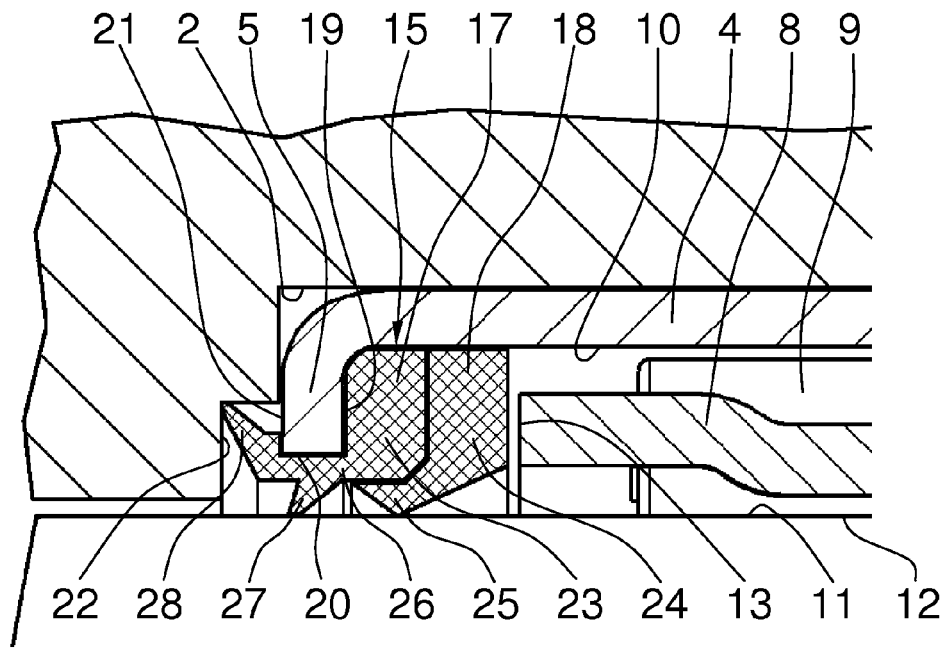
FIG. 2 shows an enlarged illustration of a first embodiment of a seal for the bearing arrangement according to the invention in accordance with FIG. 1.
Figure 3:
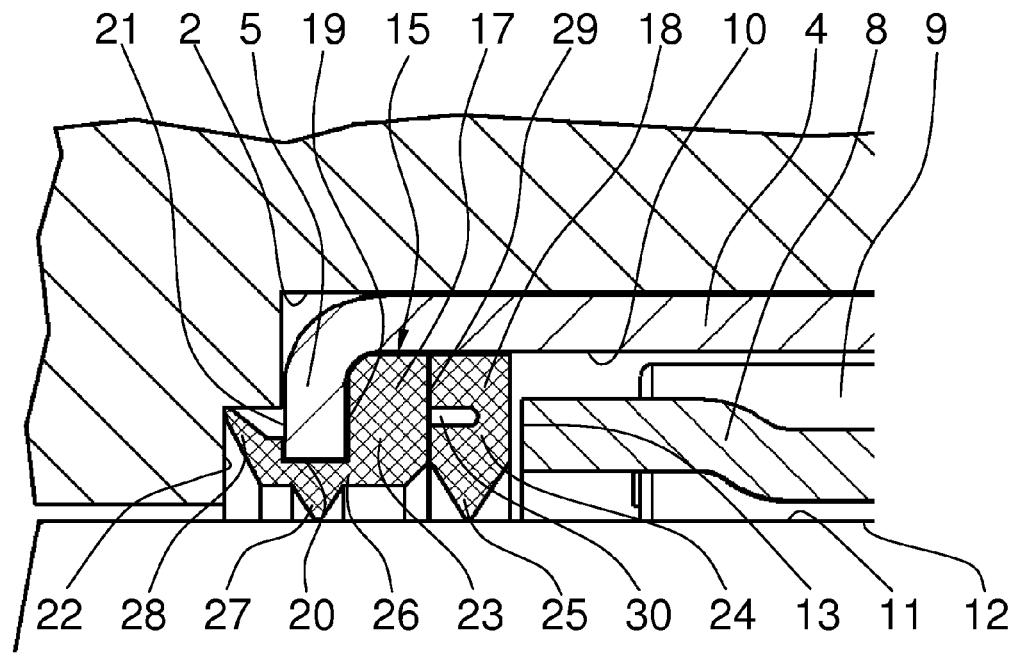
FIG. 3 shows an enlarged illustration of a second embodiment of a seal for the bearing arrangement according to the invention in accordance with FIG. 1.

It can then be seen in FIGS. 2 and 3 that, in order to seal the needle bush 1 against that throughflow of exhaust gas condensates, at least the seal 15 which is arranged on its inflow side is formed according to the invention by a multiple-lip seal which is made from an elastomer, comprises two component rings 17, 18, and extends over that part of the internal circumferential face 10 of the outer ring 4 which is arranged between the associated rim 5 of the outer ring 4 and the adjacent side face 13 of the needle cage 8 and at the same time over the inner circumferential face 19, the end face 20 and the outer circumferential face 21 of the rim 5. It can be seen clearly here in both figures that, for this purpose, first of all that rim 5 of the outer ring 4 which is enclosed by the seal 15 is of radially shortened configuration and secondly, in front of said rim 5, the hole 2 in the housing 3 has an additional step 22 for receiving a seal.

Furthermore, it is shown clearly in FIGS. 2 and 3 that both the rim-side component ring 17 and the cage-side component ring 18 of the seal 15 which are jointly configured with a basic profile part 23, 24 which virtually fills the space between the rim 5 of the outer ring 4 and the side face 13 of the needle cage 8 and that the basic profile part 24 of the cage-side component ring 18 has a first radial sealing lip 25 which is in sealing contact with the shaft 12 and which extends either below the rim-side component ring 17 or directly towards the shaft 12. Said basic profile part 23 of the rim-side component ring 17 is then adjoined by a profile limb 26 which extends below the end face 18 of the rim 5 of the outer ring 4 as far as in front of the rim 5 and has a second radial sealing lip 27 which is in sealing contact with the shaft 12 and at the end of which finally a third radial sealing lip 28 is also arranged which is in sealing contact with the additional step 22 of the hole 2 in the housing 3 and is set obliquely with respect to the radial circumferential face of the step 28.

Finally, it is also apparent from FIG. 3 that the second embodiment which is shown therein differs above all from the first embodiment, shown in FIG. 2, of the seal 15 in that a circumferential annular groove 30 is additionally arranged in the rim-side side face 29 of the cage-side component ring 18 of the seal 15, which annular groove 30 is provided to increase the elasticity of the first radial sealing lip 25 which is formed integrally on said component ring 18.

LIST OF DESIGNATIONS

1 Needle bush
2 Hole in 3
3 Housing
4 Outer ring of 1
5 Rim on 4
6 Rim on 4
7 Needle ring of 1
8 Needle cage of 7
9 Bearing needles in 8
10 Inner circumferential face of 4
11 Outer circumferential face of 12
12 Shaft
13 Side face of 8
14 Side face of 8
15 Seal in 4
16 Seal in 4
17 Rim-side component part of 15
18 Cage-side component part of 15
19 Inner circumferential face of 5
20 End face of 5
21 Outer circumferential face of 5
22 Step in 2
23 Basic profile part of 17
24 Basic profile part of 18
25 First sealing lip on 24
26 Profile limb on 17
27 Second sealing lip on 26
28 Third sealing lip on 26
29 Side face of 18
30 Annular groove in 29

The invention claimed is:

1. A radial roller bearing assembly, comprising substantially a thin-walled outer ring which is insertable into a hole of a housing and has two radially inwardly directed rims on axial sides thereof, a needle ring held in the outer ring by said rims and is formed by a needle cage and a multiplicity of bearing needles which are guided in the needle cage at uniform spacings in a circumferential direction and roll on an inner circumferential face of the outer ring and on an outer circumferential face of a shaft to be mounted or of a separate inner ring, at least two seals which protect the needle bush against contaminants from outside and loss of lubricant arranged axially next to side faces of the needle cage at least one of the seals is configured as a multiple-lip seal made from an elastomer which comprises at least two component rings arranged adjacent to one another and extends over that part of the inner circumferential face of the outer ring which is arranged between and associated one of the rims of the outer ring and the adjacent side face of the needle cage and over an inner circumferential face, an end face and an outer circumferential face of the rim.

2. The radial roller bearing assembly as claimed in claim 1, wherein, in front of said rim, the hole in the housing has an additional step for receiving the seal.

3. The radial roller bearing assembly as claimed in claim 2, wherein the seal which is configured as the multiple-lip seal includes a rim-side component ring and a cage-side component ring, which are each jointly configured with a basic profile part which virtually fills a space between the rim of the outer ring and the side face of the needle cage.

4. The radial roller bearing assembly as claimed in claim 3, wherein the basic profile part of the cage-side component ring has a first radial sealing lip which is in sealing contact with the shaft and which extends either below the rim-side component ring or directly towards the shaft.

5. The radial roller bearing assembly as claimed in claim 4, wherein the basic profile part of the rim-side component ring is adjoined by a profile limb which extends below the end face of the rim of the outer ring as far as in front of the rim and has a second radial sealing lip which is in sealing contact with the shaft.

6. The radial roller bearing assembly as claimed in claim 5, wherein a third radial sealing lip which is in sealing contact with the additional step of the hole in the housing is arranged at an end of the profile limb, adjoining the basic profile part of the rim-side component ring.

7. The radial roller bearing assembly as claimed in claim 4, wherein a circumferential annular groove for increasing an elasticity of the first radial sealing lip which is formed integrally on the component ring is arranged in a rim-side side face of said cage-side component ring.

8. The radial roller bearing assembly as claimed in claim 1, wherein the bearing assembly comprises a needle bush configured as a throttle valve bearing for pivotably mounting a throttle valve shaft of a regulating device for exhaust gas recirculation in internal combustion engines, said needle bush is configured for sealing against throughflow of exhaust gas condensates on an inflow side by way of the seal which is configured as the multiple-lip seal.

* * * * *